United States Patent
Cohen

(10) Patent No.: US 8,864,517 B2
(45) Date of Patent: Oct. 21, 2014

(54) POWER TRANSMISSION MODULE

(71) Applicant: Avraham Cohen, Great Neck, NY (US)

(72) Inventor: Avraham Cohen, Great Neck, NY (US)

( * ) Notice: Subject to any disclaimer, the term of this patent is extended or adjusted under 35 U.S.C. 154(b) by 27 days.

(21) Appl. No.: 13/647,930

(22) Filed: Oct. 9, 2012

(65) Prior Publication Data

US 2014/0030912 A1 Jan. 30, 2014

Related U.S. Application Data

(60) Provisional application No. 61/741,685, filed on Jul. 26, 2012.

(51) Int. Cl.
| | |
|---|---|
| *H01R 13/66* | (2006.01) |
| *G06F 1/16* | (2006.01) |
| *H01R 31/06* | (2006.01) |
| *H01R 13/73* | (2006.01) |

(52) U.S. Cl.
CPC ............... *H01R 13/73* (2013.01); *H04M 18/06* (2013.01); *G06F 1/1632* (2013.01); *H01R 31/065* (2013.01)
USPC .......................................... 439/536; 439/652

(58) Field of Classification Search
USPC .................................. 439/536, 652
See application file for complete search history.

(56) References Cited

U.S. PATENT DOCUMENTS

| | | | | |
|---|---|---|---|---|
| 2,392,445 | A | | 1/1946 | Church .......................... 439/527 |
| 3,522,595 | A | | 8/1970 | White ............................ 340/593 |
| 4,282,591 | A | | 8/1981 | Andreuccetti ................... 368/10 |
| 4,425,725 | A | | 1/1984 | Moustakas et al. ............. 40/725 |
| 4,536,694 | A | * | 8/1985 | McCarty et al. ............... 320/111 |
| 4,707,564 | A | | 11/1987 | Gonzales ......................... 174/66 |
| D310,992 | S | | 10/1990 | Rosenbaum et al. ........ D13/170 |
| 5,562,488 | A | * | 10/1996 | Neiser et al. ................... 439/501 |
| 5,574,256 | A | * | 11/1996 | Cottone .......................... 174/53 |
| 5,700,158 | A | * | 12/1997 | Neiser et al. ................... 439/501 |
| 5,738,548 | A | * | 4/1998 | Rutulante ...................... 439/652 |
| 6,050,849 | A | * | 4/2000 | Chang ............................ 439/536 |
| 6,619,981 | B2 | * | 9/2003 | Neiser ........................... 439/501 |
| 7,230,181 | B2 | | 6/2007 | Simmons et al. ............... 174/66 |
| 7,270,436 | B2 | | 9/2007 | Jasper ............................. 362/95 |
| 7,528,323 | B2 | | 5/2009 | Wu et al. ......................... 174/66 |
| 7,812,257 | B2 | | 10/2010 | Gunderman et al. ........... 174/66 |
| 7,887,341 | B2 | * | 2/2011 | Liao ............................... 439/131 |
| 7,911,757 | B2 | * | 3/2011 | Hsu et al. ....................... 361/118 |
| 7,915,529 | B2 | | 3/2011 | Crotinger et al. ............... 174/66 |
| 8,143,520 | B2 | | 3/2012 | Cutler ............................. 174/66 |
| 8,203,077 | B2 | | 6/2012 | Honeycutt et al. .............. 174/66 |
| 2007/0275595 | A1 | * | 11/2007 | Hazani et al. ................. 439/536 |
| 2011/0017486 | A1 | | 1/2011 | Cutler ............................. 174/66 |
| 2011/0132634 | A1 | | 6/2011 | Fetzer-Westmeister ........ 174/66 |
| 2011/0175570 | A1 | | 7/2011 | Lucas ............................ 320/109 |

* cited by examiner

*Primary Examiner* — Gary Paumen

(57) ABSTRACT

Disclosed is a power transmission module having a main support configured to be mounted at a power outlet and including a power input connector for connection with the output of a recharger and an output connector for connection with a rechargeable device.

16 Claims, 19 Drawing Sheets

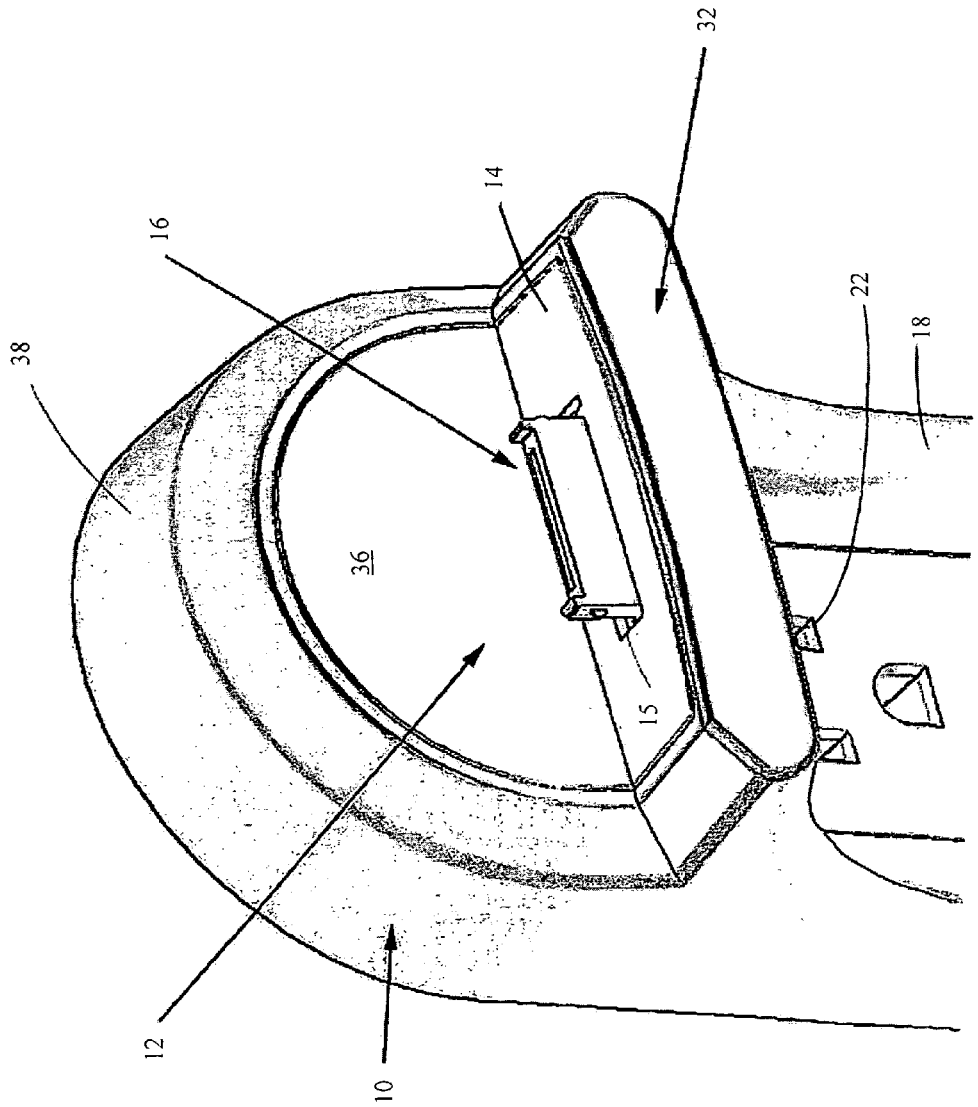

POWER TRANSMISSION MODULE

CROSS-REFERENCE TO RELATED APPLICATIONS

The present application claims priority of U.S. Provisional Patent Application No. 61/741,685, entitled OUTLET FACEPLATE WITH INTEGRATED DEVICE CHARGER filed Jul. 26, 2012 by Avraham Cohen, the entire contents of which are hereby incorporated in full by reference.

FIELD OF THE INVENTION

The present invention is concerned with a module for transmission of power from a charger to a rechargeable device, such as a cell phone, an MP3 player or a PDA.

BACKGROUND

The prior art discloses a number of examples of a faceplate that is configured to include a shelf or the like for supporting an object at a power outlet. Examples include U.S. Pat. No. 7,812,257, U.S. Patent Publication Nos. 2011/0132634 and 2011/0175570. The prior art also includes references that disclose wall plate assemblies with a USB connector (see U.S. Pat. No. 7,915,529), a face plate assembly with a shelf for supporting a cell phone and means for hiding a portion of the cable extending from the charger to the cell phone (see U.S. Pat. No. 7,528,323) and an assembly that includes a shelf, power outlets and an integrated cable having an output connector for connection to a cell phone presumably for recharging the phone while it rests on the shelf.

As is well known, each type of rechargeable device (e.g. a cell phone) may have its own charger with a power output connector that is connectable to an input connector of the cell phone. The power output connector and the power input connector usually have unique configurations and the circuitry inside the charger may be unique to the cell phone that the charger charges. Thus, usually, the charger of one type of device cannot be used with another type of device. Therefore, the device such as the one disclosed by U.S. Pat. No. 7,528,323 can only be used with a cell phone for which it is configured.

SUMMARY OF THE INVENTION

It is an object of the present invention to provide a device that does not suffer from the drawbacks of the prior art.

A device according to the present invention is a power transmission module that includes a shelf having a platform surface through which an output connector is accessible for connection to a chargeable device, and an input connector accessible by a charger suitable for charging the chargeable device, the input connector being electrically connected with the output connector for transmission of power from the charger to the chargeable device.

In its preferred form, a module according to the present invention is mountable at an AC line power outlet so that, in use, it would be close to the charger.

In one preferred embodiment, a module according to the present invention would include a window frame having an opening through which an AC power outlet is rendered accessible for connection with a charger. Thus, a module according to the present invention may include features for mounting the module like a wall plate whereby its window frame and its shelf portion may be supported at an outlet. The window frame may be configured to allow access to more than one AC power outlet.

A power transmission module according to the present invention may include a main support that is mountable at a power outlet, a power input connector configured to be detachably attachable to a power output connector of a charger configured to connect to an AC power outlet, and a power output connector electrically connected to the power input connector and configured to be detachably attachable to a rechargeable device.

In one preferred embodiment, the power input connector and the power output connector are part of a subassembly that is integrated with the main support. The subassembly may include a circuit board on which the power input connector and the power output connector are supported, and a subassembly support having a platform wall, the platform wall including an opening through which the output connector is accessible for connection by the rechargeable device.

Preferably, the input connector and the output connector are arranged on opposite planes, the input connector being arranged closer to the outlet when the module is mounted at the AC power outlet.

In a module according to the present invention, any kind of connector may be used as an input connector and any kind of connector may be used as an output connector. Thus, advantageously, for example, the input connector may be an input connector of the chargeable device so that it may be connected directly to the output connector of the charger, and the output connector may the output connector of the charger so that it may be connected directly to the input connector of the chargeable device. However, such an arrangement is not necessary for a module according to the present invention in that an adapter or the like may be used to make the connection between the input connector of the module to the output connector of the charger and an adapter may be used to connect the output connector to the input connector of the chargeable device. Thus, a module according to the present invention need not be changed once installed in place just because the chargeable device is changed.

A module according to the present invention may include one input connector and more than one output connector of either the same kind or different kinds.

In addition, a module according to the present invention may be configured to serve more than a power transmission function. Thus, for example, in a module according to the preferred embodiment of the present invention, the input connector and the output connector are supported by a subassembly support that includes a platform wall and a back wall extending away from the platform wall at an angle. The subassembly support may be made of an optically transparent or an optically translucent material and may support a circuit board on which the connectors are located. The circuit board may further include components for an LED driver that drives an LED mounted on the back wall, mounted elsewhere on the module, or mounted behind the back wall to light up the back wall, when, for example, the back wall is transparent or translucent.

Furthermore, in addition to or instead of LED driver circuit components, the circuit board may include components for audio signal processing in order to send audio signals to a loudspeaker mounted on the back wall (or elsewhere on the module) and/or receive audio signals for processing from a microphone mounted on the back wall or elsewhere on the module. Thus, the module may include a loudspeaker, a microphone or both operable connected to an audio processing circuit supported by the circuit board Other features and advantages of the present invention will become apparent from the following description of the invention which refers to the accompanying drawings.

BRIEF DESCRIPTION OF THE DRAWINGS

FIG. 5 illustrates an enlarged view of another portion of the first embodiment.

FIGS. 7C and 7D illustrate, respectively, bottom and top plan views of the circuit board shown in FIG. 7B viewed in the direction of arrows 7C (bottom view) and 7D (top view).

DETAILED DESCRIPTION OF EMBODIMENTS OF THE INVENTION

Figure 1:
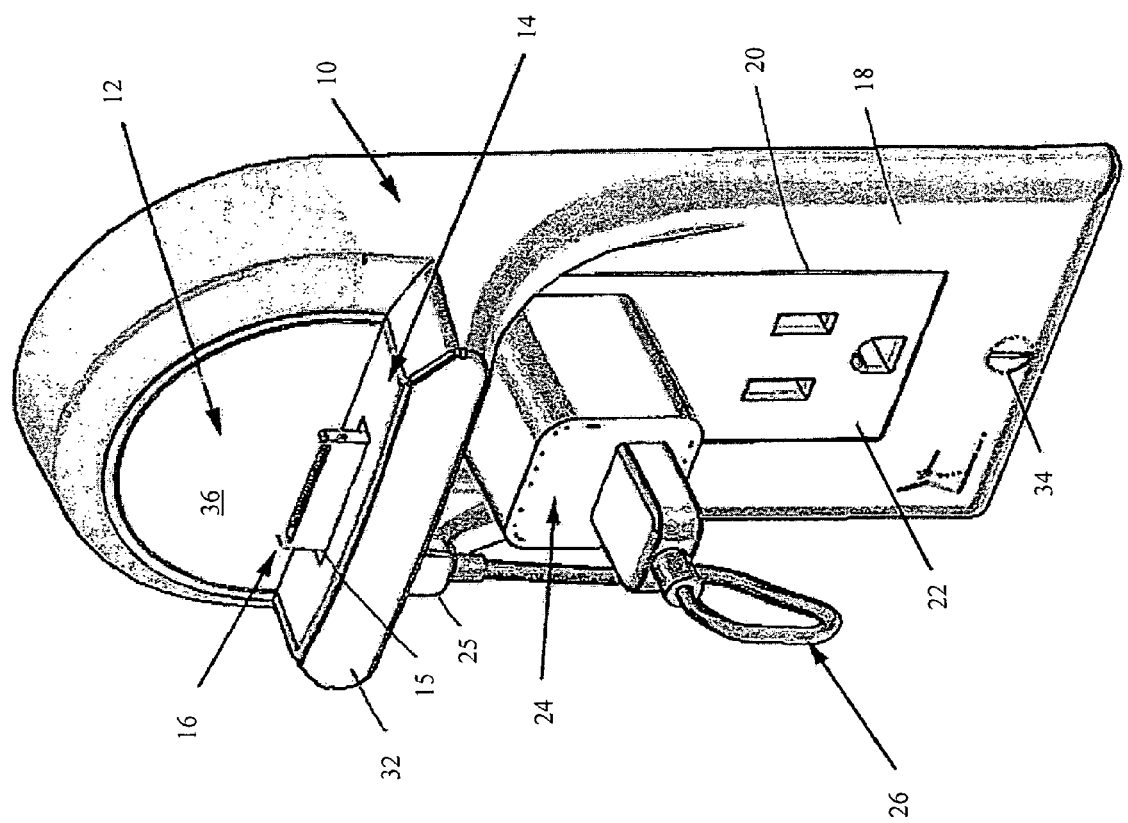
FIG. 1 illustrates a top perspective view of a power transmission module according to the first embodiment of the present invention in an assembled state and installed at an AC power outlet.
Figure 2:
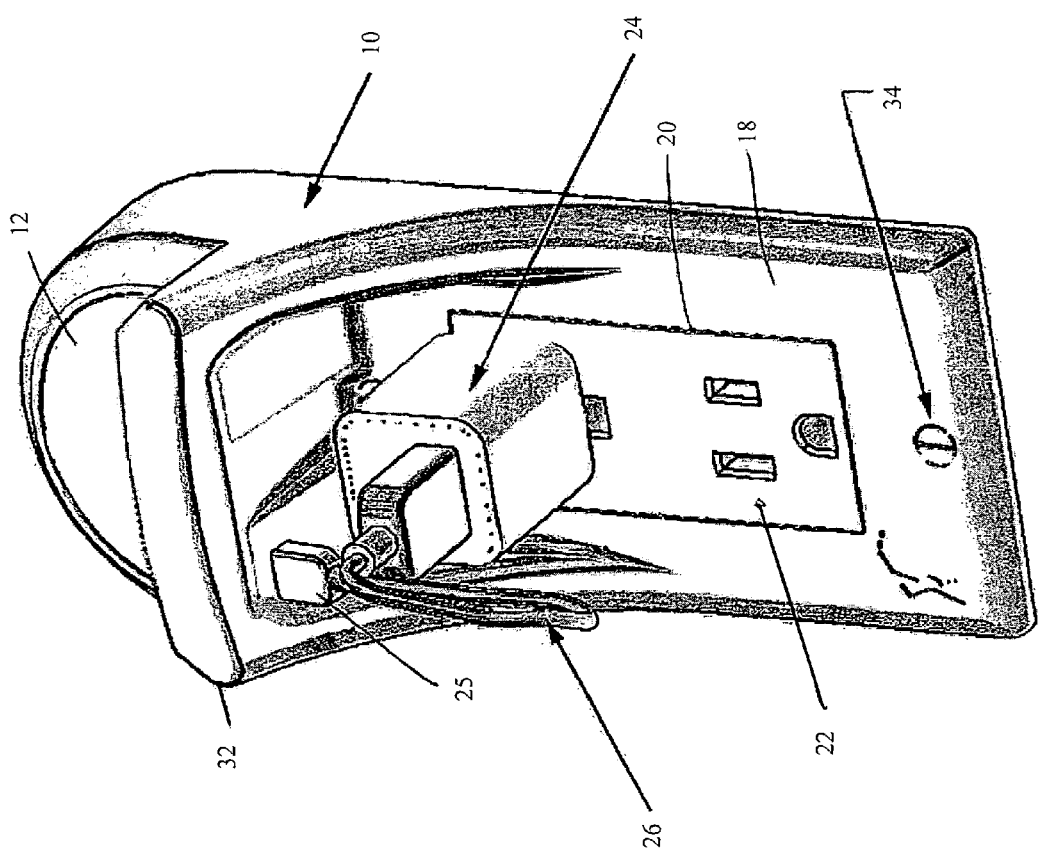
FIG. 2 illustrates a bottom perspective view of the module shown in FIG. 1

Referring to FIG. 1, a power transmission module according to the first embodiment of the present invention includes a main support 10, a subassembly support 12 that includes at least one platform surface 14 with an opening 15 through which an output connector 16 emerges for detachable attachment (i.e. mechanical and electrical connection) to a corresponding power input connector of a rechargeable device such as a cell phone, an MP3 player, a PDA, or the like personal device.

Main support 10 preferably includes a window frame portion 18 preferably residing below output connector 16. Frame portion 18 includes an opening 20 through which at least one conventional, AC power outlet 22 is accessible by the power connectors of a conventional electrical device. For example, as illustrated, a conventional power charger 24 with conventional power input plugs (not shown) is received by one outlet 22. Power charger 24 includes a power output connector 25 at the end of a power transmission cable 26. Power output connector 25 is received by a power input connector 28 (see FIG. 3) preferably located below output connector 16 and accessible through an input connector opening 30 in main support 10.

Figure 3:
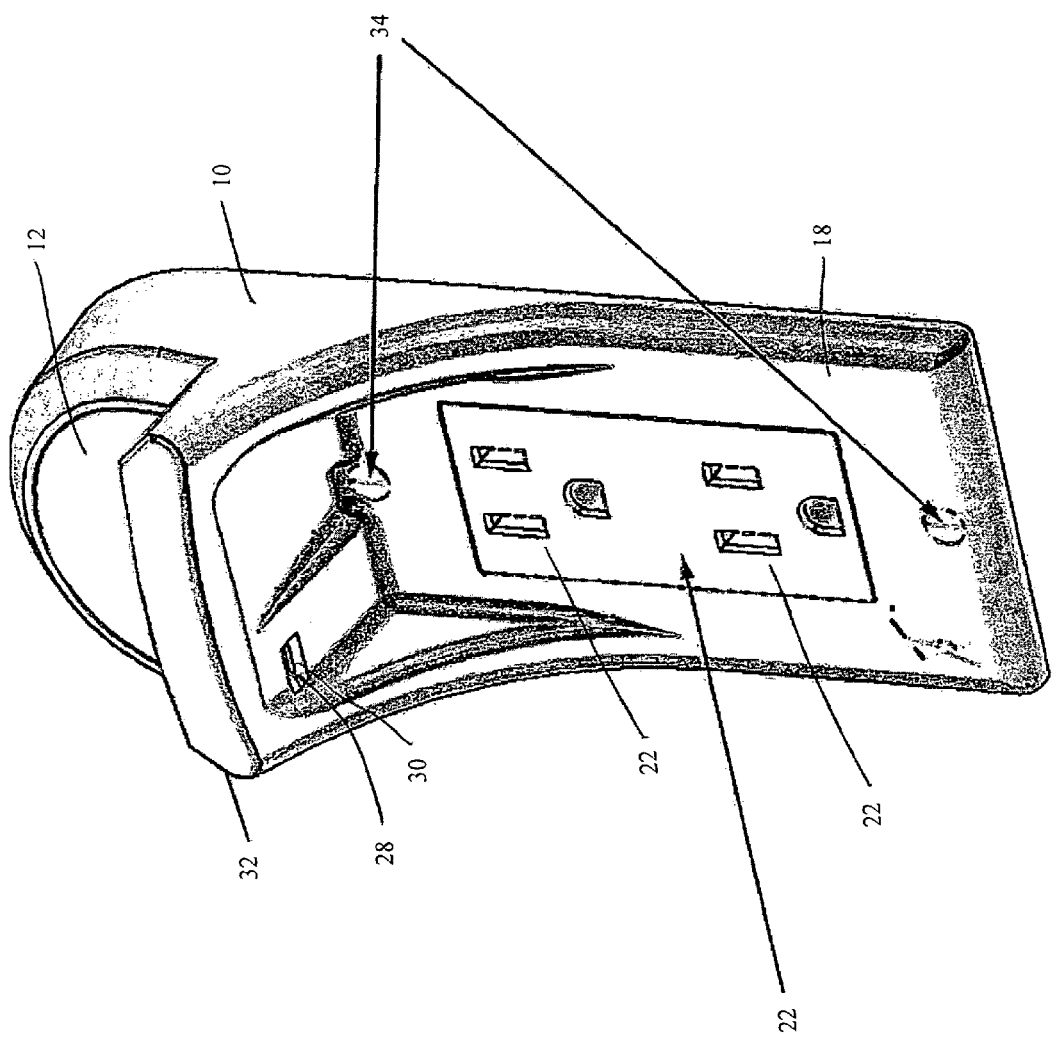
FIG. 3 illustrates another bottom perspective view of the first embodiment.
Figure 4:
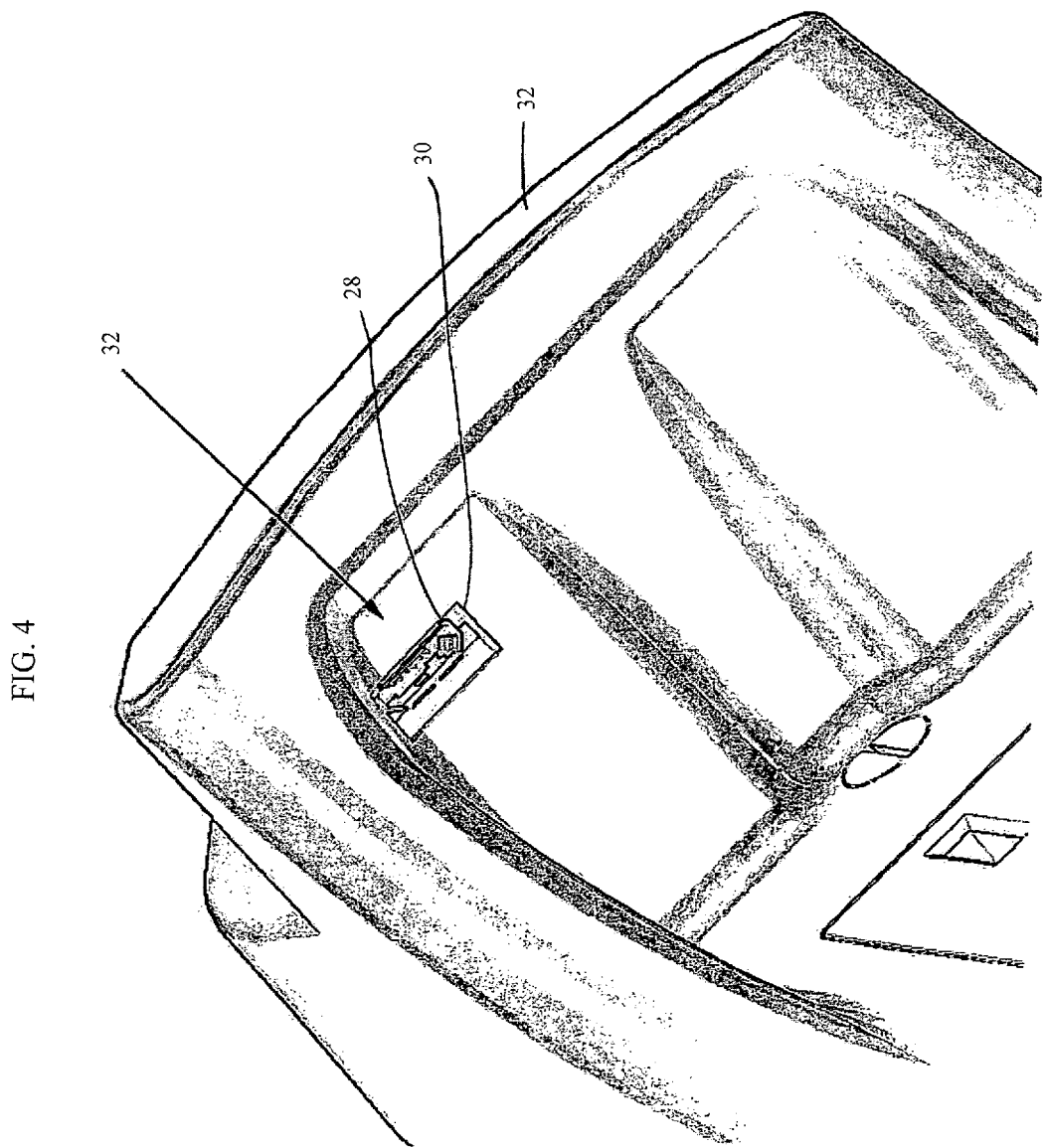
FIG. 4 illustrates an enlarged view of a portion of the first embodiment.

Referring to FIG. 3 and FIG. 4, in the preferred embodiment, main support 10 includes a ledge portion 32 located above outlets 22 and above frame portion 18. In this preferred embodiment, input connector 28 is accessible for detachable attachment (i.e. electrical and mechanical connection) at a location below platform surface 14, while output connector 16 is accessible for electrical and mechanical connection from a location above platform surface 14. While it is preferred to have input connector 28 and output connector 16 accessible from opposite surfaces, it should be noted that other arrangements are within the scope of the present invention. Together, platform surface 14 and ledge 32 constitute a shelf portion that can support a rechargeable device above an AC power outlet 22 while the device is being recharged.

Also, preferably, frame portion 18 is provided with eyelets for receiving screws 34 so that main support 10 can be mounted in place of an ordinary wallplate, although other mounting methods may be employed without deviating from the scope of the present invention. Preferably, the outside dimensions of frame portion 18 are at least large enough to cover the gaps around outlets 22 to provide a finished look once a module according to the present invention is installed in place.

Referring to FIG. 5, preferably, subassembly support 12 includes a back surface 36 that extends at an angle in a direction away (e.g. vertically) from platform surface 14. Back surface 36 is preferably semicircular, but this shape is not critical. Back surface 36 may serve many practical functions. For example, a label may be attached to back surface 36 so that output connector 16 may be correctly identified. Thus, for example, when there are many people in a household or office, the label can identify whose cell phone should be used with which module. Furthermore, if subassembly support is made of an optically transparent or translucent material an LED or the like located behind or on back surface 36 can light up to indicate the location of the module, or to indicate that the module is in operation. Moreover, for example, back surface 36 can support a loudspeaker that can generate sound based on signals received from a device connected to output connector 16, and/or a microphone to transmit captured sound to the device connected to output connector 16.

Note that, in the preferred embodiment, main support 10 includes an upper frame portion 38, above ledge portion 32, that frames back surface 36.

Figure 6A:
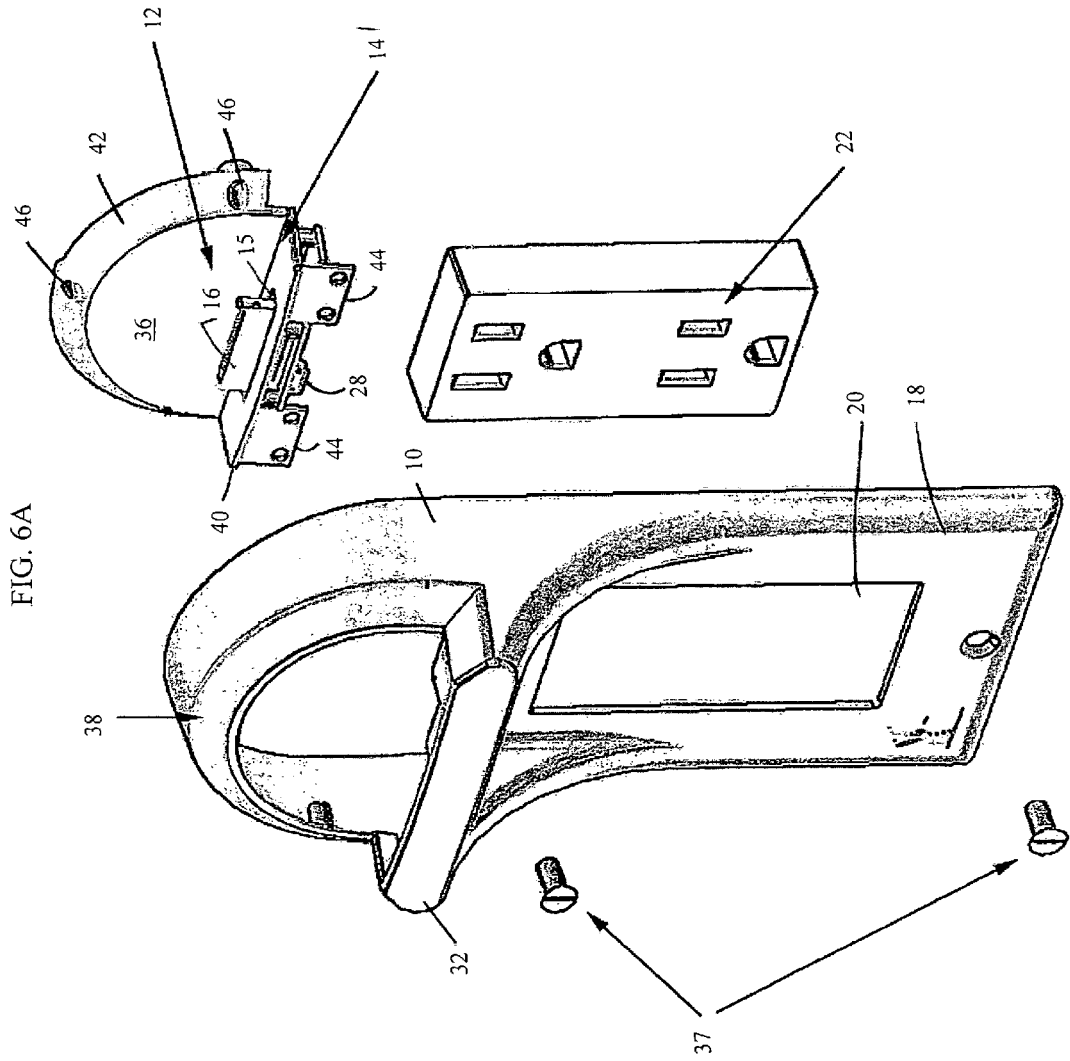
FIG. 6A illustrates a module according to the first embodiment of the present invention in a disassembled state.
Figure 6B:
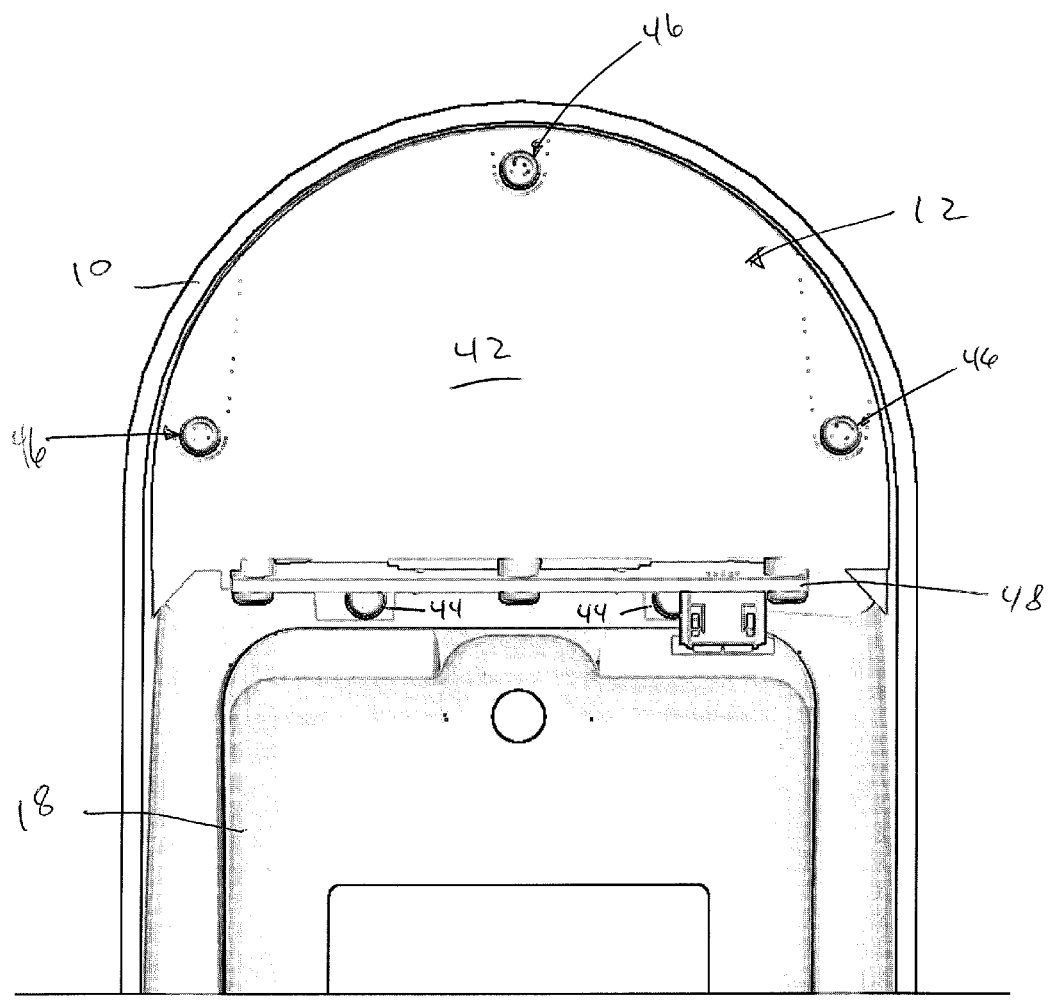
FIG. 6B illustrates a back plan view of a top portion of a module in an assembled state according to the first embodiment of the present invention.
Figure 7A:
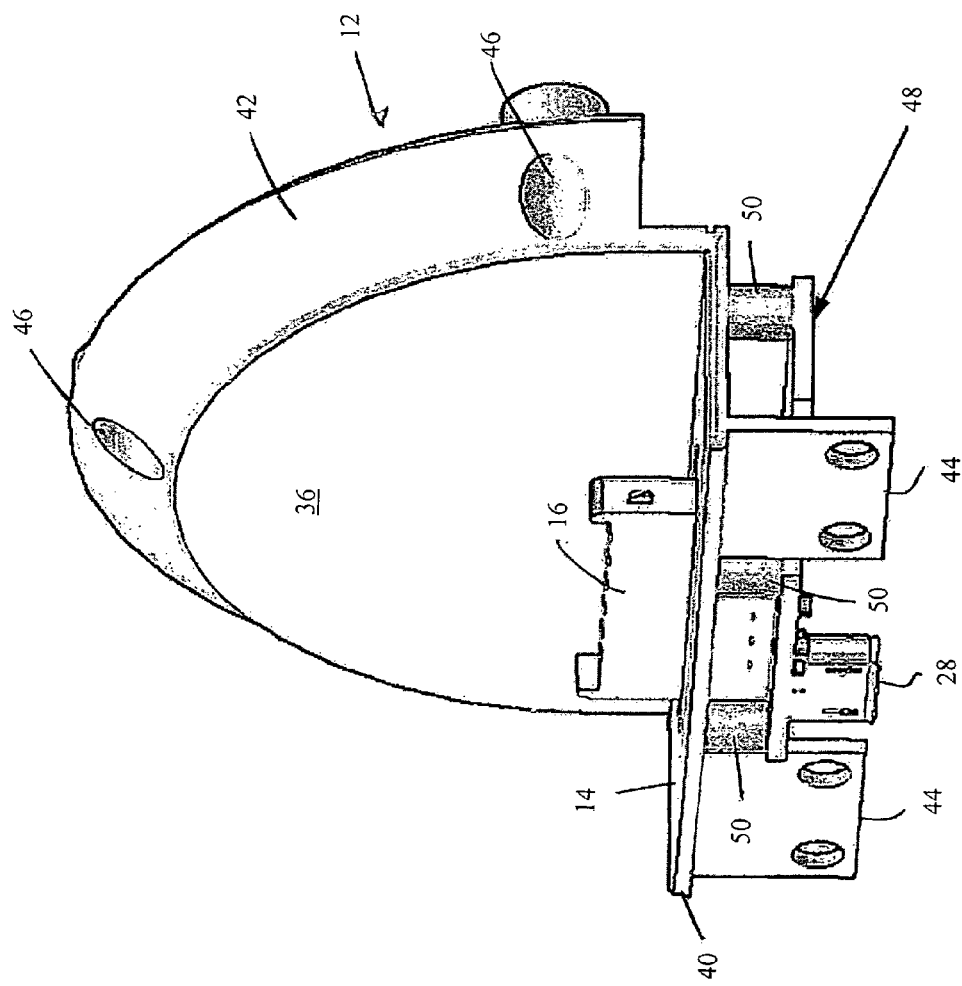
FIG. 7A illustrates the power transmission subassembly portion of a module according to the first embodiment.
Figure 7B:
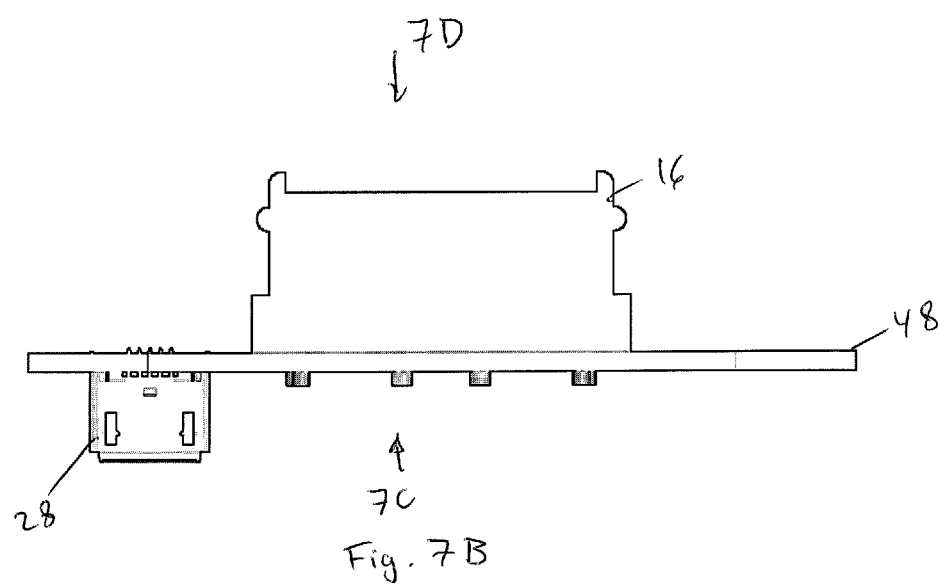
FIG. 7B illustrates a front plan view of a circuit board, which is part of subassembly in a module according to the present invention.

FIG. 6A illustrates a module according to the present invention in a disassembled state. Thus, subassembly support 12 is shown to be separated from main support 10. As seen in FIG. 6A, main support 10 is a unitary body which may be made of a suitable plastic. Subassembly support 12 may also be made of a suitable opaque, transparent, or translucent plastic having a platform wall 40 that includes platform surface 14 and a back wall 42 that includes back surface 36. Platform wall 40 includes mounting brackets 44 having eyelets for receiving screws that are used to mount to respective screw bases residing on an interior surface (see FIG. 6B) of main support 10, opposite its exterior surface adjacent. Further, eyelets 46 are defined in back wall 42 to receive screws for mounting into corresponding further screw bases residing on the interior surface of main support 10 (see FIG. 6B). Thus, in the preferred embodiment, screws may be used to mount subassembly support 12 to main support 10, although snap-fit coupling or the like may also be used without deviating from the scope of the invention.

Referring to FIGS. 7A-7D, according to one aspect of the present invention, a circuit board 48 is mounted to platform wall 40. To be more specific, platform wall 40 is provided with spacers 50 which extend from a surface directly opposite to platform surface 14 of platform wall 40 and circuit board 48 is mounted to spacers 50 with screws or the like. Output connector 16 is mounted on a first surface of circuit board 48 while input connector 28 is mounted on a second surface directly opposite the first surface. The first surface of circuit board 48 faces platform wall 40 and is arranged so that output connector 16 extends through opening 15 to be accessible by a rechargeable device. Moreover, circuit board 48 is arranged so that input connector at least aligns with opening 30 in main support 30 so that it may be accessible by the power outlet connection of a recharger.

Figure 8:
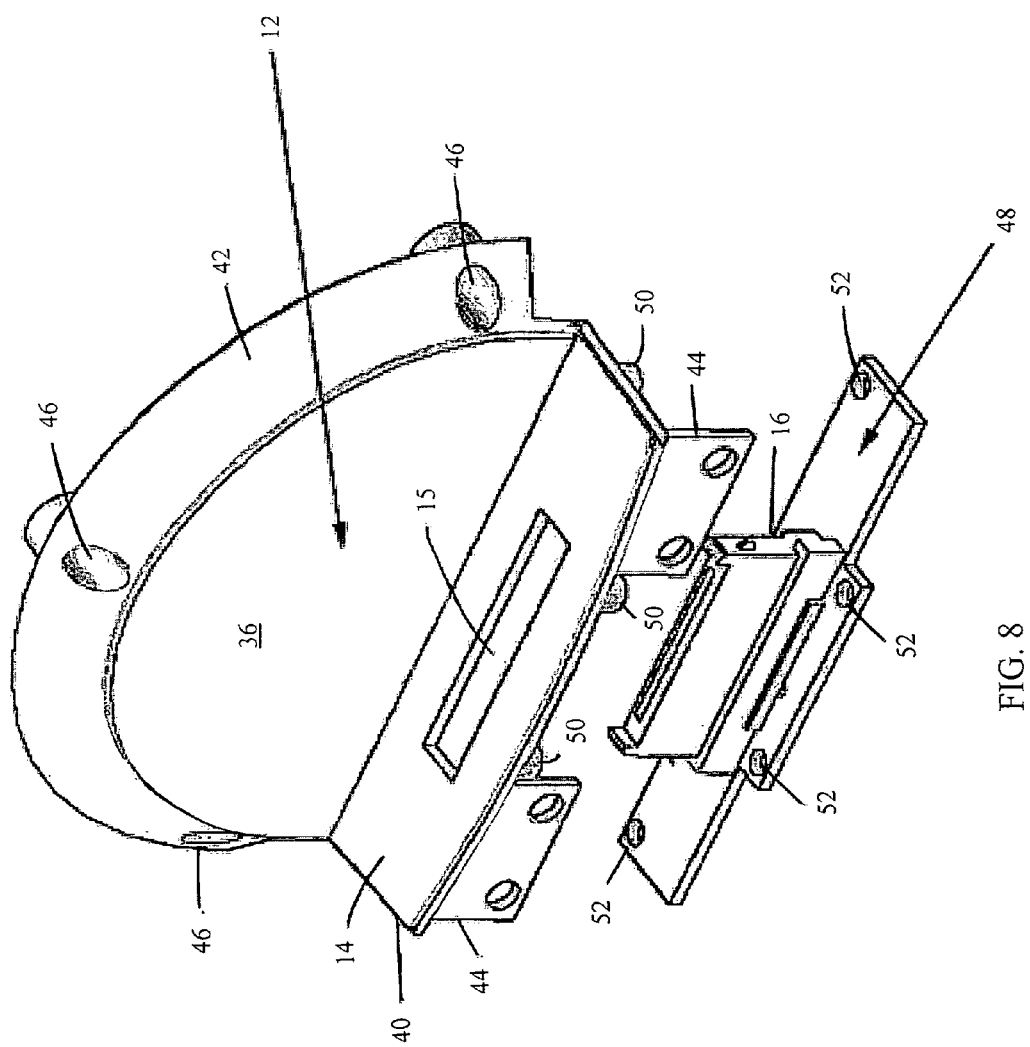
FIG. 8 illustrates a front perspective view of the power transmission subassembly of FIG. 7 in a disassembled state.
Figure 9:
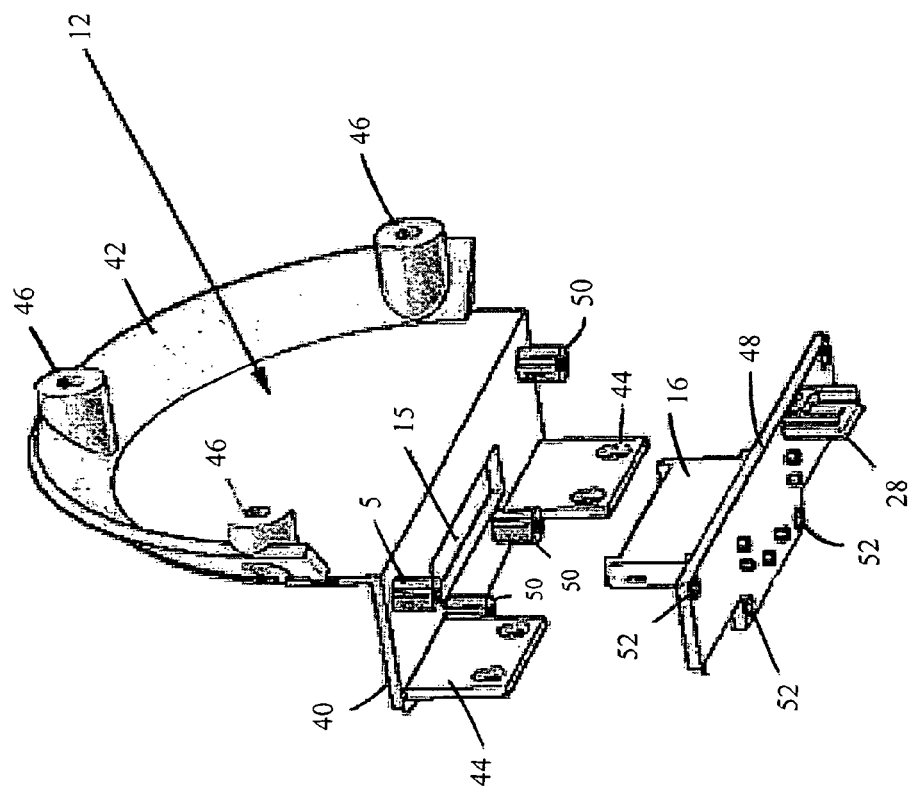
FIG. 9 illustrates a back perspective view of the power transmission subassembly of FIG. 7 in a disassembled state.

FIGS. 8 and 9 illustrate circuit board 48 and subassembly support 12 in a disassembled state. As seen, circuit board 48 includes eyelets 52 each for receiving a screw or the like intended for mounting circuit board 48 to spacers 50. It should be noted that while screw mounting is shown as a preferred method other methods such as snap fitting may be used without deviation from the scope of the present invention.

According to an aspect of the present invention, circuit board 48 is used to connect input connector 28 to output connector 16, whereby power may be transmitted from input connector 28 to output connector 16. That is, circuit board 48 includes conductive bodies (e.g. traces or conductive vias) that would be electrically connected to input connector 28 and output connector 16 to transmit power from input connector 28 to output connector 16.

Note that while circuit board 48 may serve as an intermediary in power transmission from input connector 28 to output connector 16, it may also be used as support for additional functions, while getting power from input connector 28. For example, circuit board 48 may include circuit components for driving an LED residing on the module (e.g. on or behind surface 36 as described earlier). As a further example, circuit board 28 may include circuit components to serve as an audio processor to receive and process audio signals from a microphone, and/or to operate a loudspeaker residing on subassembly support 12 as described earlier.

Figure 10:
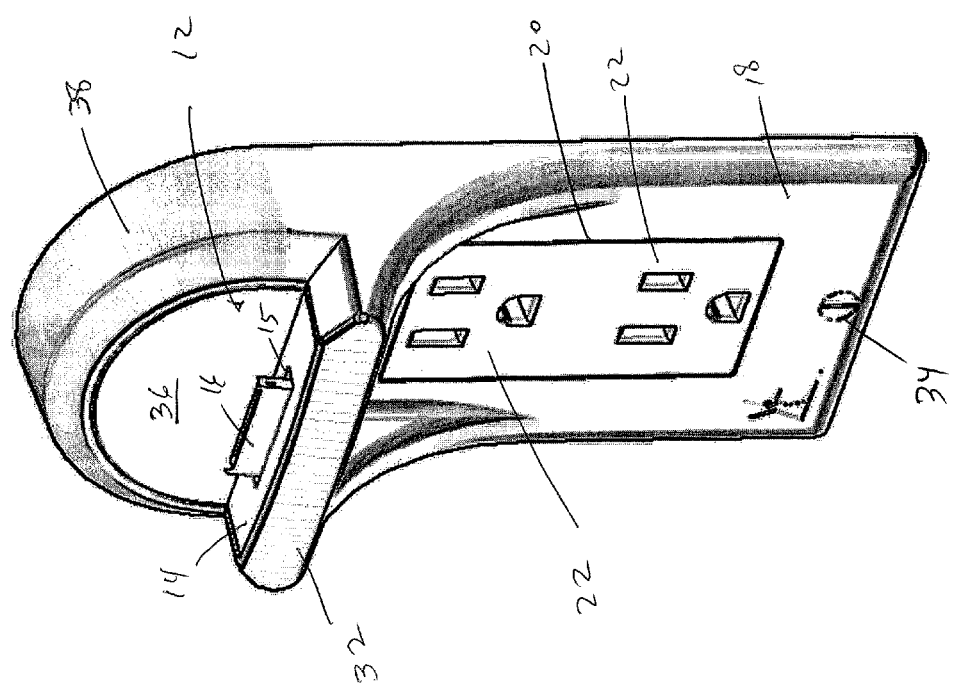
FIG. 10 illustrates a front perspective view of a power transmission module according to the first embodiment installed at AC power outlets.

FIG. 10 illustrates a module according to the preferred embodiment (as seen in FIG. 1 without a charger 24) assembled at and around conventional power outlets 22. In this variation, two outlets 22 are accessible from a common surface.

Figure 11:
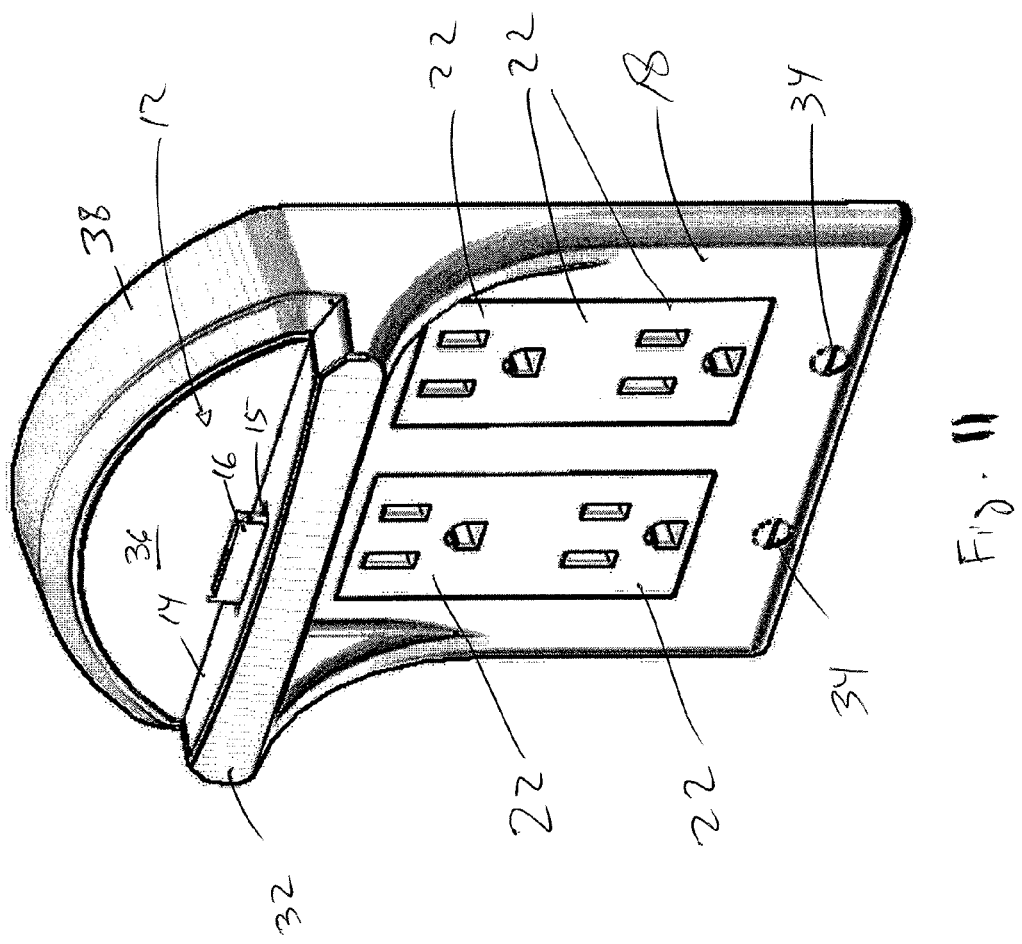
FIG. 11 illustrates a front perspective view of a power transmission module according to the second embodiment installed at four AC power outlets.

FIG. 11 illustrates a module according to a second embodiment, in which like numerals identify like features. In this embodiment, frame portion 18 includes two openings 20 each for allowing access to two power outlets 22, each pair being accessible from a respective common surface.

Figure 12:
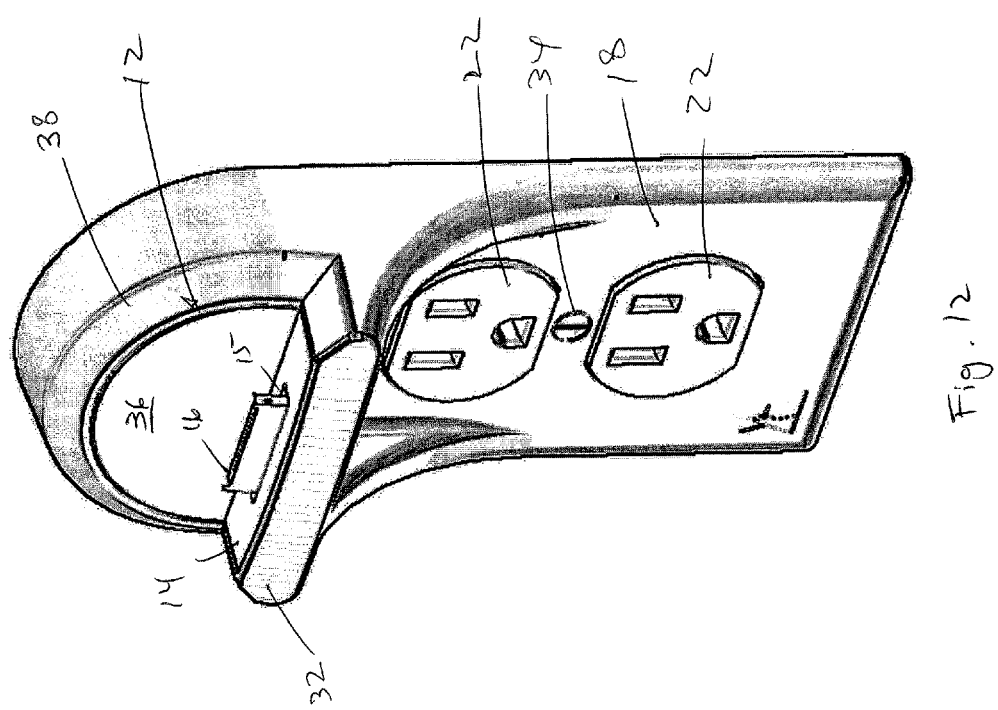
FIG. 12 illustrates a front perspective view of a power transmission module according to the third embodiment installed at two AC power outlets.
Figure 13:
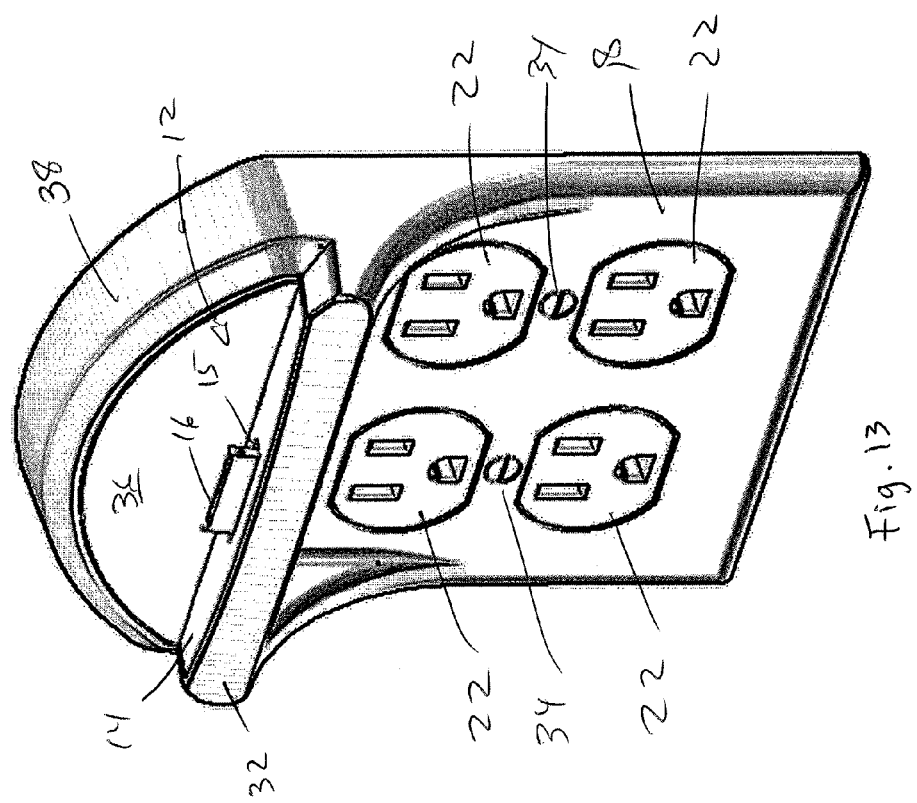
FIG. 13 illustrates a front perspective view of a power transmission module according to the fourth embodiment installed at four AC power outlets.

FIG. 12 illustrates a module according to a third embodiment, in which like numerals identify like features. In this embodiment, frame portion 18 includes two openings 20, each for allowing access to only one power outlet 22.

Figure 14:
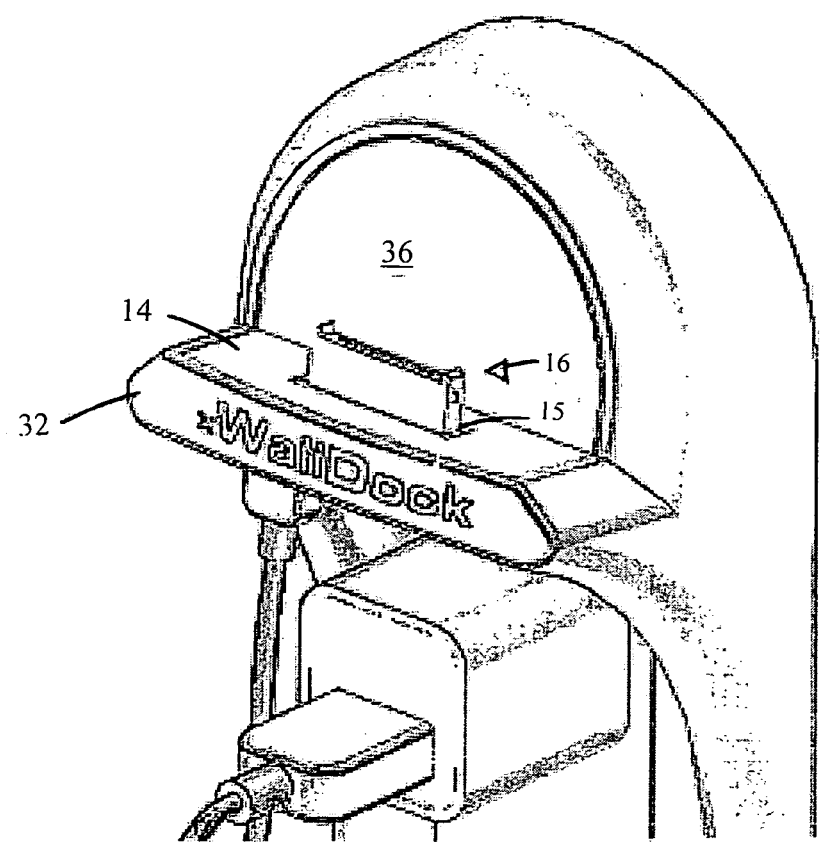
FIG. 14 illustrates a portion of a power transmission module with a first output connector variation.

FIG. 14 illustrates a fourth embodiment, in which like numerals identify like features. In this embodiment, frame portion 18 includes four openings 20, each for allowing access to only one power outlet 22.

Figure 15:
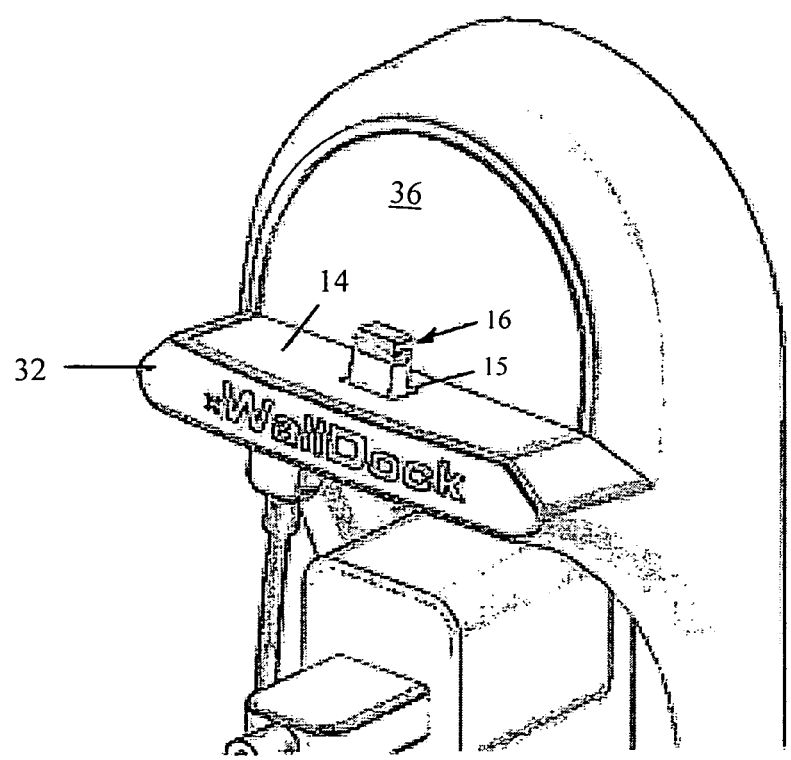
FIG. 15 illustrates a power transmission module with a second output connector variation different from the first variation.
Figure 16:
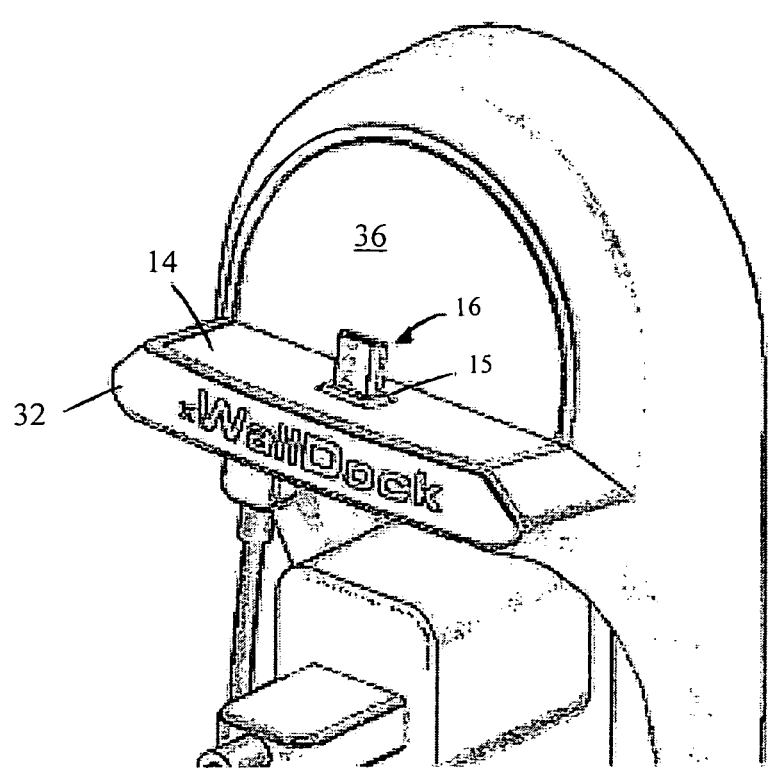
FIG. 16 illustrates a module with a third output connector variation different from the first (FIG. 14) and the second (FIG. 15) variations.

Note that an advantage of a module according to the present invention is that by mere replacement of the type of connector, the module can accommodate any device. Thus, as illustrated in FIG. 14, output connector 16 may be a conventional 30 pin connector. As illustrated in FIG. 15, output connector 16 may be a lightning connector (a connector available from Apple). As illustrated in FIG. 16, output connector 16 may be a micro-USB connector. A skilled person would recognize that an input connector 28 may also be any type of connector to suit the application without deviating from the scope of the present invention.

While male output connectors 16 are shown and deemed most preferred, female connectors, when appropriate would be deemed within the present invention.

Figure 17:
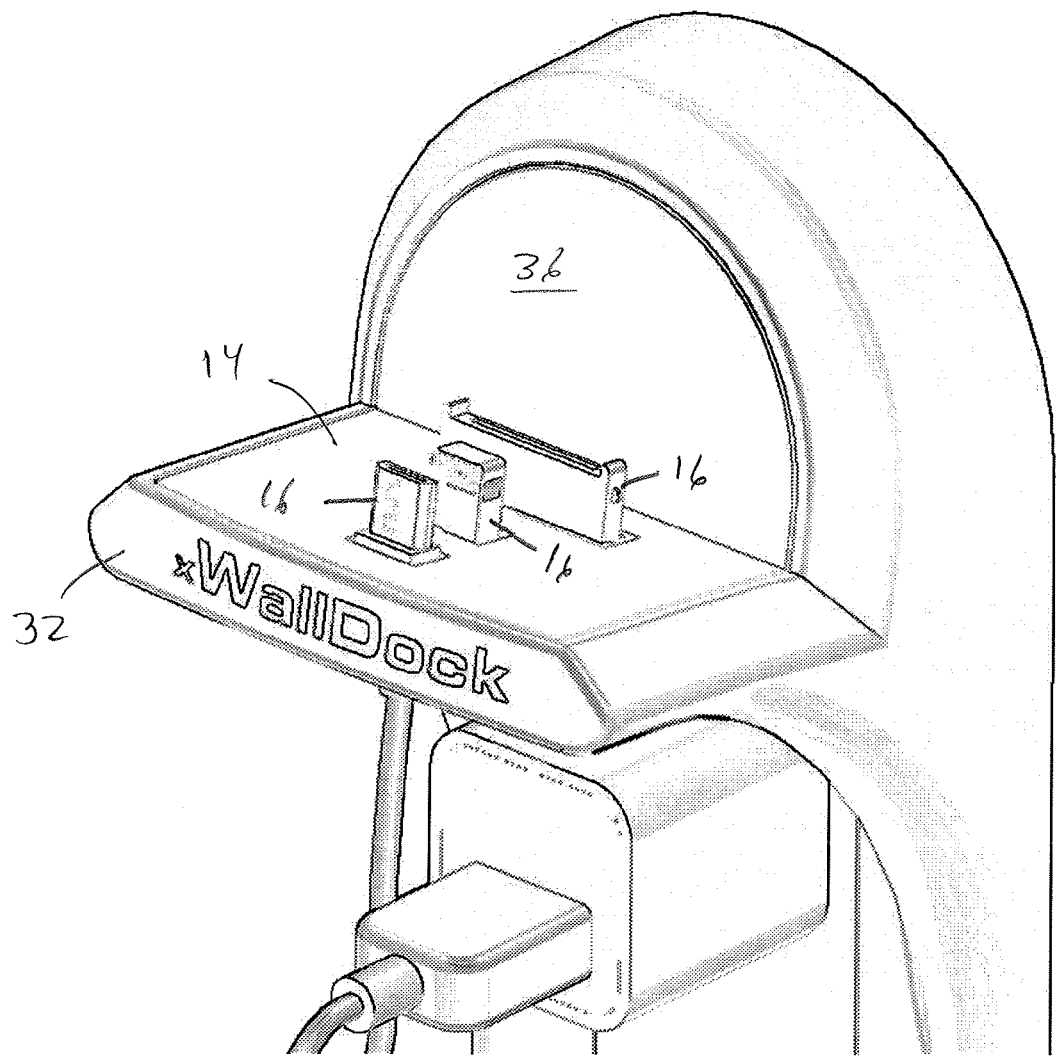
FIG. 17 illustrates a module that input the output connectors of shown in FIG. 14, FIG. 15 and FIG. 16.

Moreover, while the preferred embodiments only include one input connector 28 and one output connector 16, it should be understood that a module according to the present invention may include one input connector 28 and multiple output connectors 16, or multiple input connectors 28 each for a respective output connector. Thus, as illustrate in FIG. 17, a module according to the present invention may includes three different output connectors 26, e.g. the output connectors of the modules of FIGS. 14, 15, and 16. The output connectors may be arranged in a column (i.e. one closest to the front edge of platform surface 14, and the other two directly behind the front-most output connector), or in a row (i.e. all output connectors 16 arranged lateral to one another). Note that while the example shown in FIG. 17 includes output connectors with different configurations to accommodate devices with different input connectors, all or some of the output connectors may be the same to accommodate a plurality of devices with the same input connector configurations. Thus, one module can be used to accommodate several devices.

Furthermore, it should be noted that while a module with a main support 10 and a subassembly support 12 that is separable from main support 10 is preferred, a skilled person would realize that a module in which the subassembly support (i.e. support for at least circuit board 48) and the main support form a unitary body would be within the scope of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A power transmission module, comprising:
a main support that is mountable at a power outlet;
a power input connector configured to be detachably attachable to a power output connector of a charger configured to receive power from said power outlet; and
a power output connector electrically connected to said power input connector and configured to be detachably attachable to a rechargeable device, wherein said power input connector and said power output connector that is connected to said power input connector are in a subassembly that is integrated with said main support, and wherein said subassembly includes a subassembly support having a platform wall, said platform wall including an opening through which said power output connector that is connected to said power input connector is accessible by said device for detachable attachment.

2. The power transmission module of claim 1, wherein said subassembly includes a circuit board on which said power input connector and said power output connector that is connected to said power input connector are supported.

3. The power transmission module of claim 1, wherein said power input connector and said power output connector that is connected to said power input connector are arranged on opposite planes.

4. The power transmission module of claim 3, wherein said power input connector is arranged closer to said outlet when said module is mounted.

5. The power transmission module of claim 1, wherein said main support includes a window frame through which said outlet is accessible by said charger.

6. The power transmission module of claim 1, wherein said main support includes a window frame through which two outlets are accessible.

7. The power transmission module of claim 1, wherein said power output connector that is connected to said power input connector is a 30-pin connector.

8. The power transmission module of claim 1, wherein said power output connector that is connected to said power input connector is a lightning connector.

9. The power transmission module of claim 1, wherein said power output connector that is connected to said power input connector is a micro-USB connector.

10. The power transmission module of claim 1, wherein said main support includes a portion that can serves as a wall plate.

11. A power transmission module, comprising:
a main support that is mountable at a power outlet;
a power input connector configured to be detachably attachable to a power output connector of a charger configured to receive power from said power outlet; and
a power output connector electrically connected to said power input connector and configured to be detachably attachable to a rechargeable device, wherein
said power input connector and said power output connector that is connected to said power input connector are supported by a subassembly support, said subassembly support including a platform wall and a back wall extending away from said platform wall at an angle.

12. The power transmission module of claim 11, wherein said subassembly support is made of an optically transparent or an optically translucent material.

13. The power transmission module of claim 11, wherein said subassembly support supports a circuit board.

14. The power transmission module of claim 13, wherein said circuit board includes components for an LED driver.

15. The power transmission module of claim 13, wherein said circuit board includes components for audio signal processing.

16. A power transmission module, comprising:
a main support that is mountable at a power outlet;
a power input connector configured to be detachably attachable to a power output connector of a charger configured to receive power from said power outlet; and
a power output connector electrically connected to said power input connector and configured to be detachably attachable to a rechargeable device, wherein
said power output connector that is electrically connected to said power input connector is a 30-pin connector, or a lightning connector, or a micro-USB connector.

* * * * *